United States Patent
Murdock et al.

(10) Patent No.: US 7,080,191 B2
(45) Date of Patent: Jul. 18, 2006

(54) METHOD AND SYSTEM FOR ACCESSING MEMORY DEVICES

(75) Inventors: Brett W. Murdock, Round Rock, TX (US); Craig D. Shaw, Austin, TX (US); Jeremy A. Jacobson, Bothell, WA (US)

(73) Assignee: Freescale Semiconductor, Inc., Austin, TX (US)

( * ) Notice: Subject to any disclaimer, the term of this patent is extended or adjusted under 35 U.S.C. 154(b) by 145 days.

(21) Appl. No.: 10/034,834

(22) Filed: Dec. 27, 2001

(65) Prior Publication Data

US 2003/0126350 A1 Jul. 3, 2003

(51) Int. Cl.
*G06F 12/00* (2006.01)

(52) U.S. Cl. ...................... 711/101; 711/100

(58) Field of Classification Search ............. 711/101
See application file for complete search history.

(56) References Cited

U.S. PATENT DOCUMENTS

| 6,233,646 | B1 * | 5/2001 | Hahm | 711/2 |
| 2003/0005247 | A1 * | 1/2003 | Chang | 711/163 |
| 2003/0046485 | A1 * | 3/2003 | Zitlaw | 711/105 |
| 2003/0065893 | A1 * | 4/2003 | Lary et al. | 711/147 |

* cited by examiner

*Primary Examiner*—Mano Padmanabhan
*Assistant Examiner*—Midys Rojas

(57) ABSTRACT

A system for accessing memory devices includes a processing module coupled to a set of outputs and memory operably coupled to the processing module. The memory stores operational instructions that cause the processing module to perform a plurality of operations. A first one of the plurality of operations includes utilizing a first output to provide a first data lane enable to facilitate accessing of a portion of a first memory storage location associated with a first memory address when in a first mode of operation. A second one of the plurality of operations includes utilizing the first output to provide an address bit of a second memory address to facilitate designation of a second memory storage location when in a second mode of operation.

12 Claims, 9 Drawing Sheets

| DSZ BITS | PORT SIZE | PORT LOCATION | A[z] | A[y] | A[x] | A[w] |
|---|---|---|---|---|---|---|
| 000 | 8 BIT | D[31:24] | A[n+1] | A[1] | A[0] | $\overline{EB[0]}$ |
| 001 | 8 BIT | D[23:16] | A[n+1] | A[1] | $\overline{EB[1]}$ | A[0] |
| 010 | 8 BIT | D[15:8] | A[n+1] | $\overline{EB[2]}$ | A[1] | A[0] |
| 011 | 8 BIT | D[7:0] | $\overline{EB[3]}$ | A[n+1] | A[1] | A[0] |
| 100 | 16 BIT | D[31:16] | A[n+1] | A[1] | $\overline{EB[1]}$ | $\overline{EB[0]}$ |
| 101 | 16 BIT | D[15:0] | $\overline{EB[3]}$ | $\overline{EB[2]}$ | A[n+1] | A[1] |
| 110 | 32 BIT | D[31:0] | $\overline{EB[3]}$ | $\overline{EB[2]}$ | $\overline{EB[1]}$ | $\overline{EB[0]}$ |
| 111 | 32 BIT | D[31:0] | $\overline{EB[3]}$ | $\overline{EB[2]}$ | $\overline{EB[1]}$ | $\overline{EB[0]}$ |

*FIG.2*

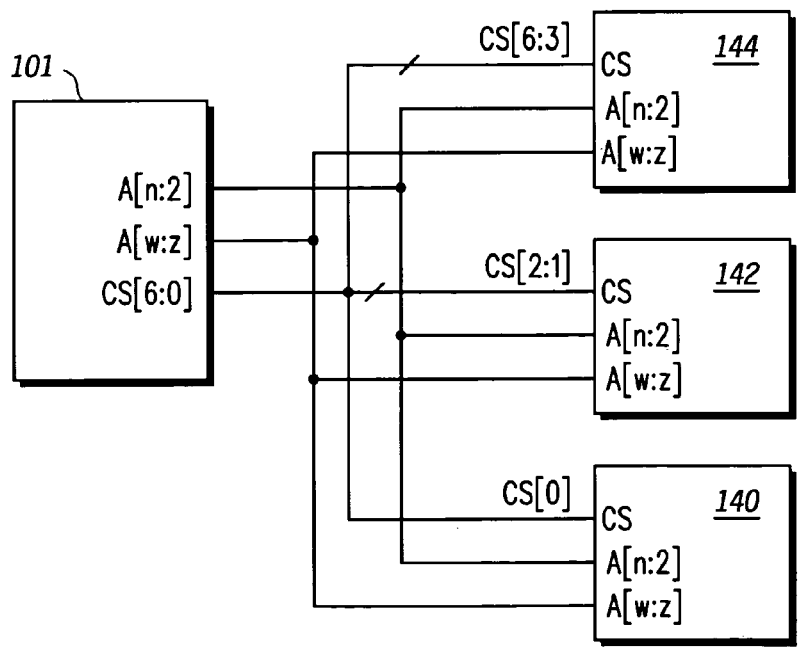

METHOD AND SYSTEM FOR ACCESSING MEMORY DEVICES

FIELD OF THE DISCLOSURE

The disclosures herein relate generally to data processors and more particularly to methods and systems for accessing memory.

BACKGROUND OF THE DISCLOSURE

In many applications, it is expected for a microprocessor to be relatively compact in size, to facilitate expected data processing performance and to support debug functionality. A microprocessor that is relatively compact in size is desirable in embedded system applications such as mobile communication devices and automotive systems. Enabling enhanced utility of on-chip and/or off-chip memory systems and peripheral resources contributes to facilitating exceptional data processing performance. An on-chip debug module provides for effective and efficient debug functionality.

Many integrated processor-based systems, such as microcontrollers, can access word, half-word and byte wide peripherals off-chip. Furthermore, such processor-based systems often include on-chip debug capability. To facilitate data access and debug functionality via such processor-based systems, a conventional processor used in such processor-based systems requires address lines A[0] to A[n], and lane strobes for accessing individual bytes of a word, for example four lane strobes for a 32-bit word, and access size bits (i.e. SIZ[1:0]) to indicate a size of an internal access being performed when in debug mode.

However, such flexibility results in unneeded pins for various types of peripheral accesses that do not need to access each byte individually. For example, when accessing a 32-bit word peripheral, the last two address bits (i.e. A[1:0]) are not required to designate the specific word to be accessed, while four byte lane strobes are used to access individual bytes of the designated word. When accessing a half-word width peripheral, the last address bit (i.e. A[0]) is not required to designate the half word, and only two of the four byte lane strobes are required to access individual bytes of the designated half word. When accessing a byte width peripheral, the two least significant address bits are used along with one of the four byte lane strobes is required.

Therefore, a system and/or method that reduces the number of device pins while maintaining functionality would be useful.

BRIEF DESCRIPTION OF THE DRAWINGS

FIG. 2 is a table view depicting a plurality of function modes of the processor-based system depicted in FIG. 1;

FIG. 3 is a block diagram view depicting an external interface module in accordance with an embodiment of the disclosures made herein, wherein the external interface module is connected to a word-wide, half word-wide and byte wide accessible memory module;

DETAILED DESCRIPTION OF THE FIGURES

The disclosures made herein relate to data processor-based systems, methods and apparatuses capable of accessing information from external memory and/or peripheral devices. Processor-based systems, methods and apparatuses in accordance with embodiments of the disclosures made herein are useful and advantageous with respect to conventional processor-based systems. Such processor-based systems, methods and apparatuses utilize outputs associated with address bits and byte lane enables to access memory from external devices in a manner that reduces the number of data-processor outputs needed without sacrificing capabilities of the data processor.

For purposes of this application, the term lane enable is used generically to describe a signal that is used to indicate a portion of a data word or partial data that is to be accessed. The lane enable can function as a strobe, or clocking-type signal, to provide a timing event to indicate when a portion of the data can be accessed. For example, a lane enable can function as a byte lane strobe during a write to memory, whereby a timing event, such as a rising edge, indicates when a portion of the data word can be written to memory. In another application, the lane enable does not provide any timing events, but instead is used to enable specific data portions to be accessed to and from a memory component or system.

Such data processor-based systems utilize at least a portion of the data processor's outputs in a plurality of different manners depending on a particular mode of operation of the processor. For example, in accordance with at least one embodiment of the disclosures made herein, a first output provides a first data lane enable for facilitating access of a portion of a first memory storage location associated with a first memory address when in a first mode of operation, and the first output provides an address bit of a second memory address for facilitating designation of a second memory storage location when in a second mode of operation. In this manner, relative to conventional data processors and data processor-based systems, fewer processor output pins are required for providing a prescribed set of functionality.

Figure 1:
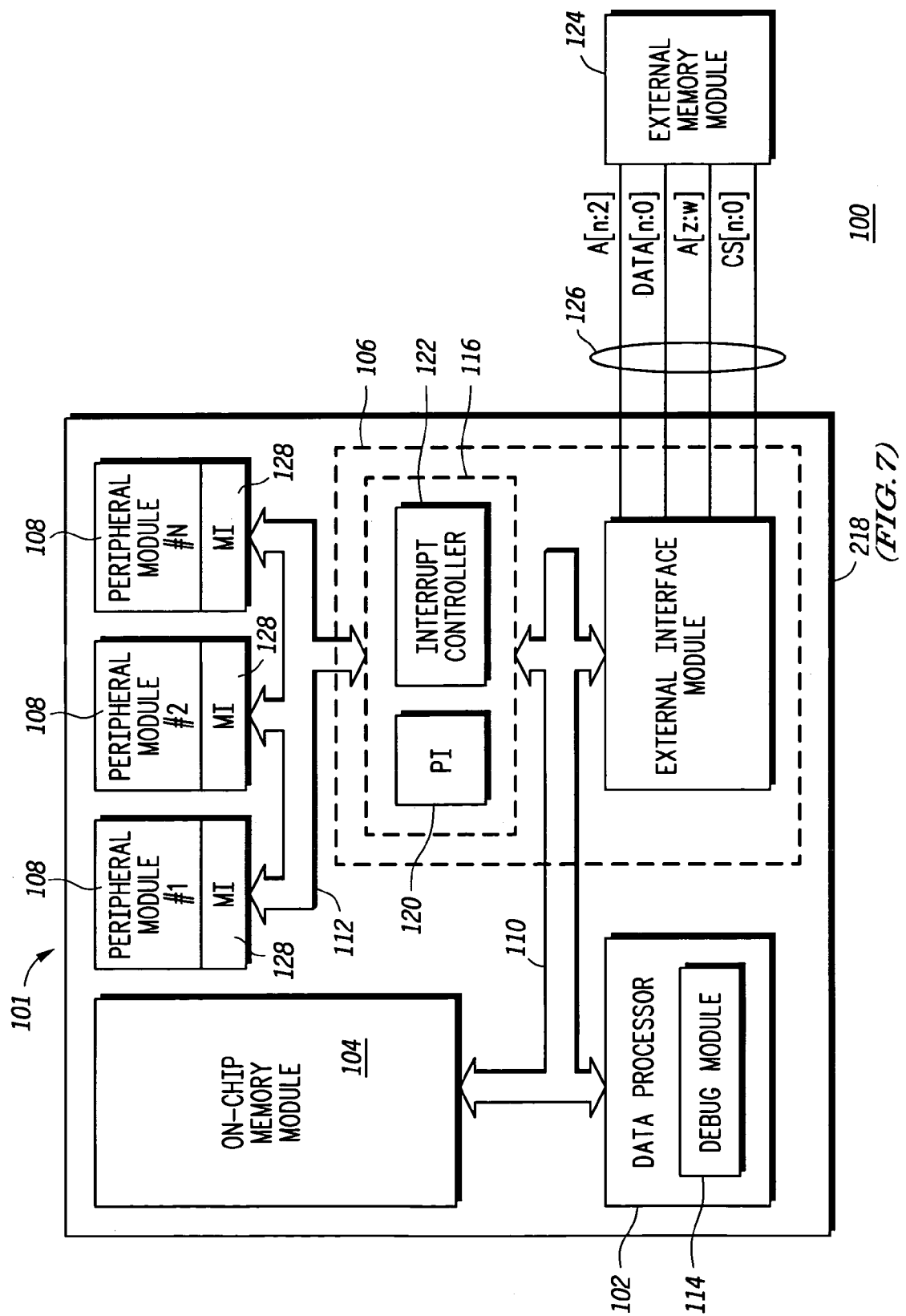
FIG. 1 is a block diagram view depicting a processor-based system in accordance with an embodiment of the disclosures made herein.

FIG. 1 depicts a processor-based system 100 in accordance with an embodiment of the invention. The processor-based system 100 includes a data processor 101, and an external memory module 124. Data processor 101 further includes a processing module 102, an on-chip memory module 104, an integrated interface module 106 and a plurality of peripheral modules 108. A first communication bus 110 is connected between the processing module 102, the on-chip memory module 104 and the integrated interface module 106. A second communication bus 112 is connected between the integrated interface module 106 and each one of the plurality of peripheral modules 104. It will be appreciated that in specific embodiments of the disclosure made herein that the various components may be coupled to each other through other intermediary components not illustrated. For example, the integrated interface module 218 may be coupled to the external memory module 124 through output drivers not illustrated.

The processing module 102 includes an integrated debug module 114. The integrated debug module 114 supports debug and/or emulation functionality such as de-bug registers that enable a developer to identify data corruption problems by monitoring data read and write accesses to program variables and instructions. Data processors including integrated debug modules are commercially available from a variety of sources. For example, an M-CORE processor offered by Motorola is an example of a data processor including an integrated debug module.

The integrated interface module 106 includes peripheral interface controller 116 and an external interface module 218. The peripheral interface controller 116 comprises a peripheral interface 120 and an interrupt controller 122. The external interface module 218 is connected to an external memory module 124 via a third communication bus 126 for providing interface functionality between the data processor 101 and the external memory module 124. The external memory module is an example of an external peripheral, which may be a primary data storage device, such as a Dynamic Random Access Memory (DRAM) or a Static Random Access Memory, or an external device that can gather or otherwise determine data values that are to be accessed by the data processor 100.

The peripheral interface 120 facilitates interface functionality between the plurality of peripheral modules 108 and the integrated interface module 106. Each one of the peripheral modules 108 includes a respective module interface 128 for supporting such interface functionality between the plurality of peripheral modules 108 and the integrated interface module 106. The interrupt controller 122 facilitates interrupt functionality between the plurality of peripheral modules 108, the processing module 102, and the integrated interface module 106. The peripheral interface controller 116 and the external interface module 218 are connected to each other via the first communication bus 110. Furthermore, the peripheral interface controller 116 and the external interface module 218 are connected to the processing module 102 and the on-chip memory module 104 via the first communication bus 110.

In accordance with embodiments of the invention disclosed herein, the external interface module 218 supports functionality of a plurality of multiplexed outputs (i.e. multiplexed outputs A[z:w]) to access the external memory module 124 in addition to conventional chip select and memory address functionality. By multiplexed outputs, it is meant that an output of data processor 101 has a plurality of different functionalities associated therewith. Examples of such different functionalities include providing byte lane enable functionality and providing address bit functionality.

FIG. 2 depicts a plurality of functional modes associated with multiplexed outputs A[z:w] in accordance with embodiments of the disclosures made herein. In one embodiment, a specific mode of operation can be indicated by a value stored in a data size register of the data processor 101. For example, data size values, as indicated in the DSZ column of the table of FIG. 2 can be used indicate a specific mode of operation.

As depicted in FIG. 2, the functionality of the multiplexed outputs A[z:w] is dynamic by access in that the functionality of the multiplexed outputs A[z:w] can vary for each external device being accessed. For example, the data processor 101 can interface with a first external memory device to operate in a first functional mode, where the multiplexed output A[x] provides byte lane enable functionality (i.e. EB[1]) for facilitating access of a portion of a first memory storage location of the first external memory device, where the first storage location is designated by address data. A second external memory device can be controlled by the data processor 101 to operate in a second functional mode, where the multiplexed output A[x] provides least significant address bit functionality (i.e. A[0] and A[1]) for facilitating designation of a memory storage location within the second external memory device. A third external memory device can operate in a third functional mode, where multiplexed output A[x] provides most significant address bit functionality (i.e. A[n+1]) for facilitating designation of a memory storage location within the third external memory device, thus expanding the addressable memory depth from n addresses to n+1 addresses.

Figure 4:
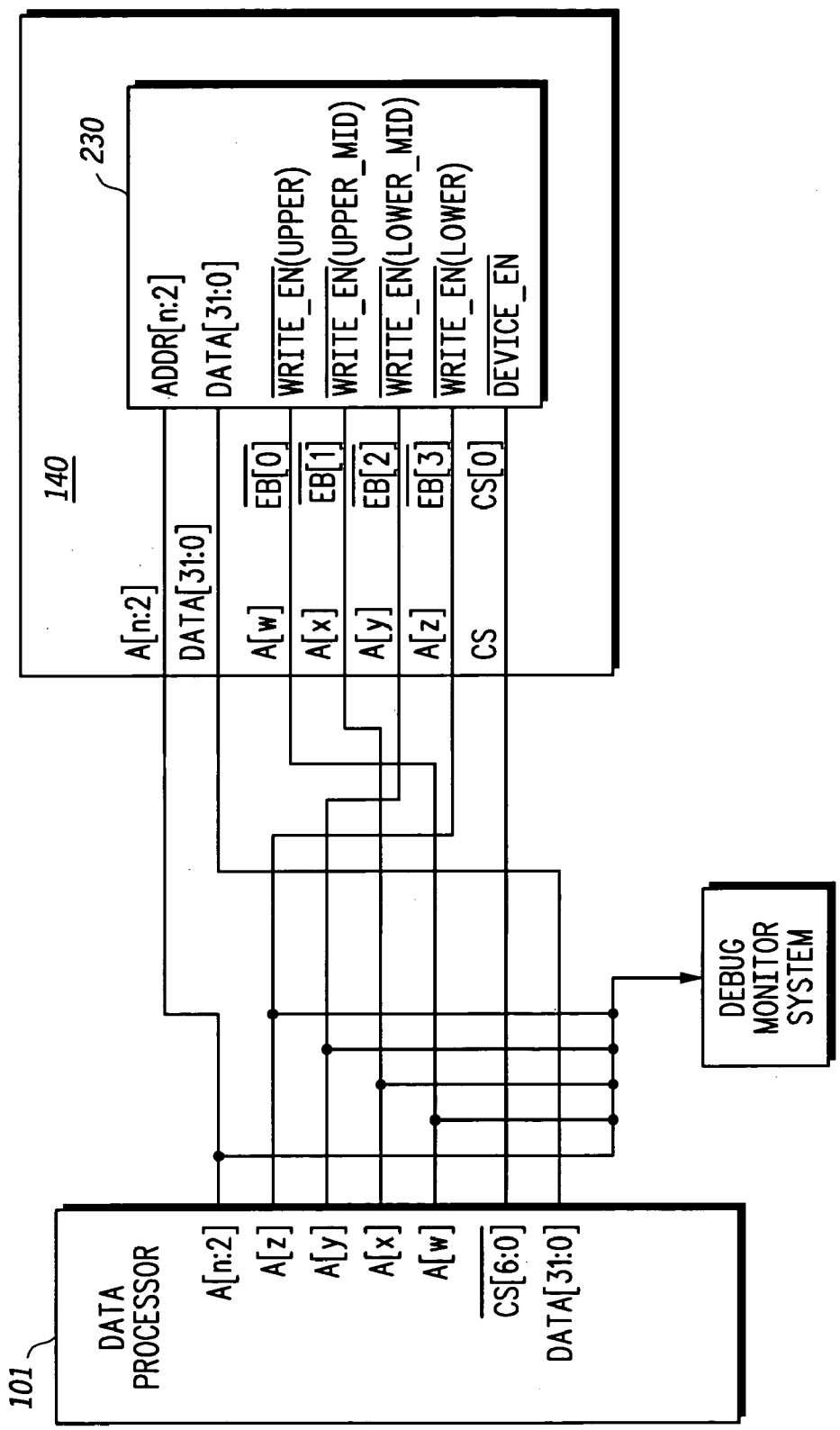
FIG. 4 is a block diagram view depicting an external interface module in accordance with an embodiment of the disclosures made herein, wherein the external interface module is connected to a word wide accessible memory module.
Figure 5:
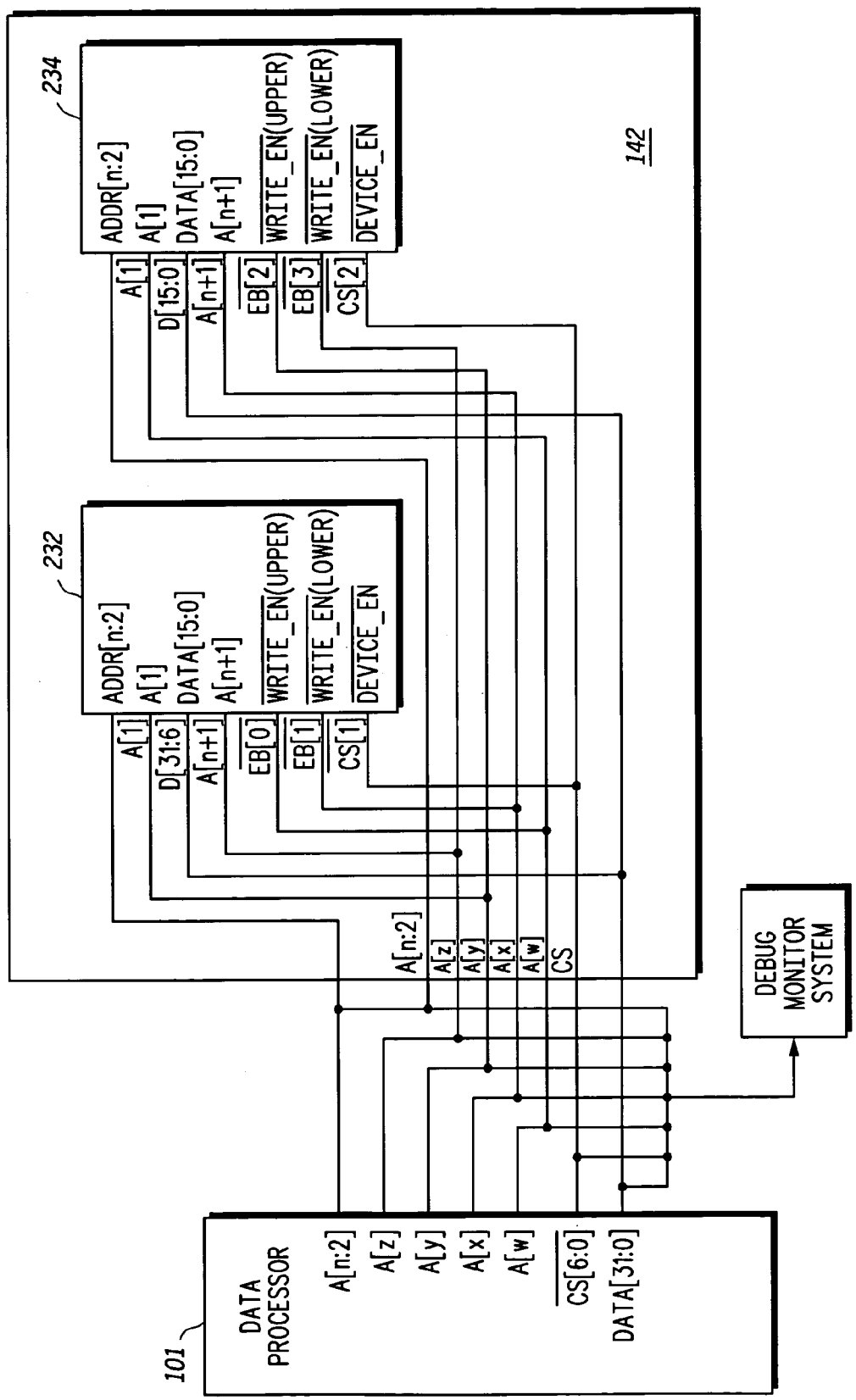
FIG. 5 is a block diagram view depicting an external interface module in accordance with an embodiment of the disclosures made herein, wherein the external interface module is connected to a half-word wide accessible memory module.

As illustrated in the table of FIG. 2, four different 8-bit modes of operation allow multiplexed outputs A[w], A[x], A[y] and A[z] to provide byte lane enable functionality EB[0], EB[1], EB[2] and EB[3], respectively, wherein each one of the multiplexed outputs A[z:w] enables access of a different byte of data (i.e. D[7:0], D[15:8], D[23:16], D[31:24]) where multiple byte wide memory devices are used (see FIG. 5). In a half-word wide memory access, such as the 16 bit modes of operations of FIG. 2, a first two of the multiplexed outputs A[z:w] enable access of a first half word of data (i.e. D[31:16]) and a second two of the multiplexed outputs A[z:w] enable access of a second half word of data (i.e. D[15:0]), as shown in FIG. 4. In a word wide memory access, such as the 16-bit modes of operations of FIG. 2, all four of the multiplexed outputs A[z:w] enable access of a word of data (i.e. D[31:0]). In at least one embodiment of a word wide memory, the number of bits associated with such a word wide memory is greater than 8. Note that the data enables EB[3:0] can be read and/or write enables used to access a specific portion of data, such as a byte, associated with a specific access. In one embodiment, the enables EB[3:0] are specifically write enables, while the access of a portion of data word is handled within the data processor 101 after an entire word is received.

When the processor-based system 100 is in a debug mode, the byte lane enable functionality provided by the multiplexed outputs A[z:w] facilitates determining a size and least significant address bits of an internal access being performed. In at least one embodiment of the disclosures made herein, the debug mode (i.e. a show-cycles mode) is recognized when the address bits and multiplexed outputs A[z:w] are active, but no chip selects are present to indicate an external access.

FIG. 3 illustrates a system where a data processor 101 is coupled to external memories 140, 142 and 144. In the embodiment illustrated, memory 140 is a memory module that provides data access using one or more word wide memory devices that are selected by chip select CS[0], memory 142 is a memory module that provides data access using one or more pairs of half-word wide memory devices that are selected by chip selects CS[1] and CS[2], memory 144 is a memory module that provides data access using one or more sets of four byte wide memory devices that are selected by chip selects CS[3], CS[4], CS[5] and CS[6]. Memory modules 140, 142 and 144 are further illustrated in FIGS. 5, 6 and 7, respectively.

FIG. 4 illustrates the connections between memory 140 and the data processor 101 in greater detail. Note that where appropriate the nodes within memory 140 are labeled with the generic names (A[w:z]) and the functional names (EB [3:0], CS[0]). In operation, CS[0] is asserted to enable access of the memory device 230. Accordingly, the functionality of the multiplexed outputs A[w:z] is according to the specific mode of operation associated with CS[0]. For example, a DSZ register associated with CS[0] can be used to specify an appropriate 32-bit mode of operation. In the embodiment illustrated, the multiplexed outputs A[w:z] to device 230 act as lane enables EB[3:0], respectively, as illustrated in the table of FIG. 2.

FIG. 5 illustrates the connections between memory 142 and the data processor 101 in greater detail. Note that where appropriate the nodes within memory 142 are labeled with their generic names (A[w:z]) and their functional names (EB[3:0], A[1], A[n+1]). In operation CS[1] is asserted to enable access of memory device 232, and CS[2] is asserted to enable access of memory device 234. Accordingly, the functionality of the multiplexed outputs A[w:z] is determined according to specific mode of operation associated with CS[1] and CS[2] respectively. For example, a DSZ register associated with CS[1] can be used to specify an appropriate 16-bit mode of operation, while a different DSZ register associated with CS[2] can be used to specify the same or a different 16-bit mode of operation. In the embodiment illustrated, the multiplexed outputs A[w:z] to device 232 act as EB[1:0], A[1], and A[n+1], respectively, as illustrated in the table of FIG. 2.

Figure 6:
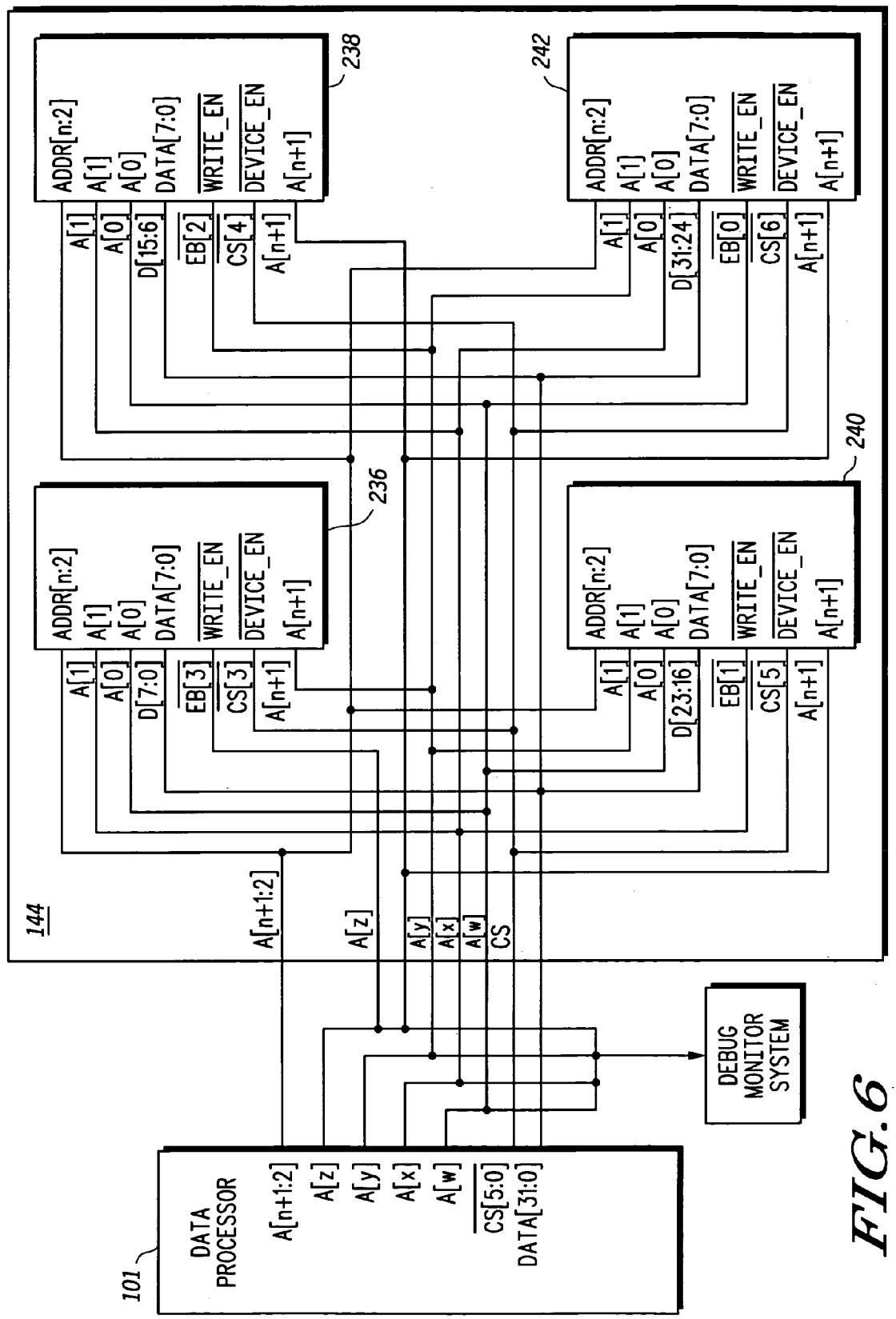
FIG. 6 is a block diagram view depicting an external interface module in accordance with an embodiment of the disclosures made herein, wherein the external interface module is connected to a byte wide accessible memory module.

FIG. 6 illustrates the connections between memory 144 and the data processor 101 in greater detail. Note that where appropriate the nodes within memory 144 are labeled with their generic names (A[w:z]) and their functional names (EB[4:0], A[0], A[1], A[n+1]). In operation CS[3] is asserted to enable access of memory device 236, CS[4] is asserted to enable access of memory device 238, CS[5] is asserted to enable access of memory device 240, CS[6] is asserted to enable access of memory device 242. Accordingly, the functionality of the multiplexed outputs A[w:z] is determined according to specific mode of operation associated with CS[3], CS[4], CS[5] and CS[6] respectively. For example, a DSZ register associated with CS[3] can be used to specify an appropriate 16-bit mode of operation, while a different DSZ register associated with CS[4] can be used to specify the same or a different 16-bit mode of operation. In the embodiment illustrated, the multiplexed outputs A[w:z] to device 236 act as EB[3], A[1:0], and A[n+1], respectively, as illustrated in the table of FIG. 2.

The data processor 101 is a component of a processor-based system, such as system 100, in accordance with an embodiment of the disclosures made herein. The processor-based system 101 depicted in FIG. 1 is an example of such a processor-based system. The data processor 101 facilitates address generation functionality (e.g. A[n:2], A[n+1:2]), chip select functionality (i.e. CS[5:0]), byte lane enable functionality (i.e. A[z:w]) and data transmission functionality (i.e. Data[31:0]).

In accordance with embodiments of the disclosures made herein, at least one of the multiplexed outputs A[z:w] is capable of providing byte lane enable functionality and address bit functionality depending on a mode of operation. Furthermore, the processor-based system comprising the external interface module 218 may be connected to a debug monitor system which will debug the multiplexed outputs A[z:w] when an internal access is being displayed on the external address and data busses. For example, if no chip select is externally active, and the address and data bus, and any corresponding control signals, are being asserted, an external debug monitor system will assume that an internal access is occurring and use the external signals to monitor the internal data accesses. In one embodiment, the multiplexed outputs indicate what bytes of data are being accessed by an internal access. From this data, the debug monitor can determine a size and location for a specific address A[n:2].

Figure 7:
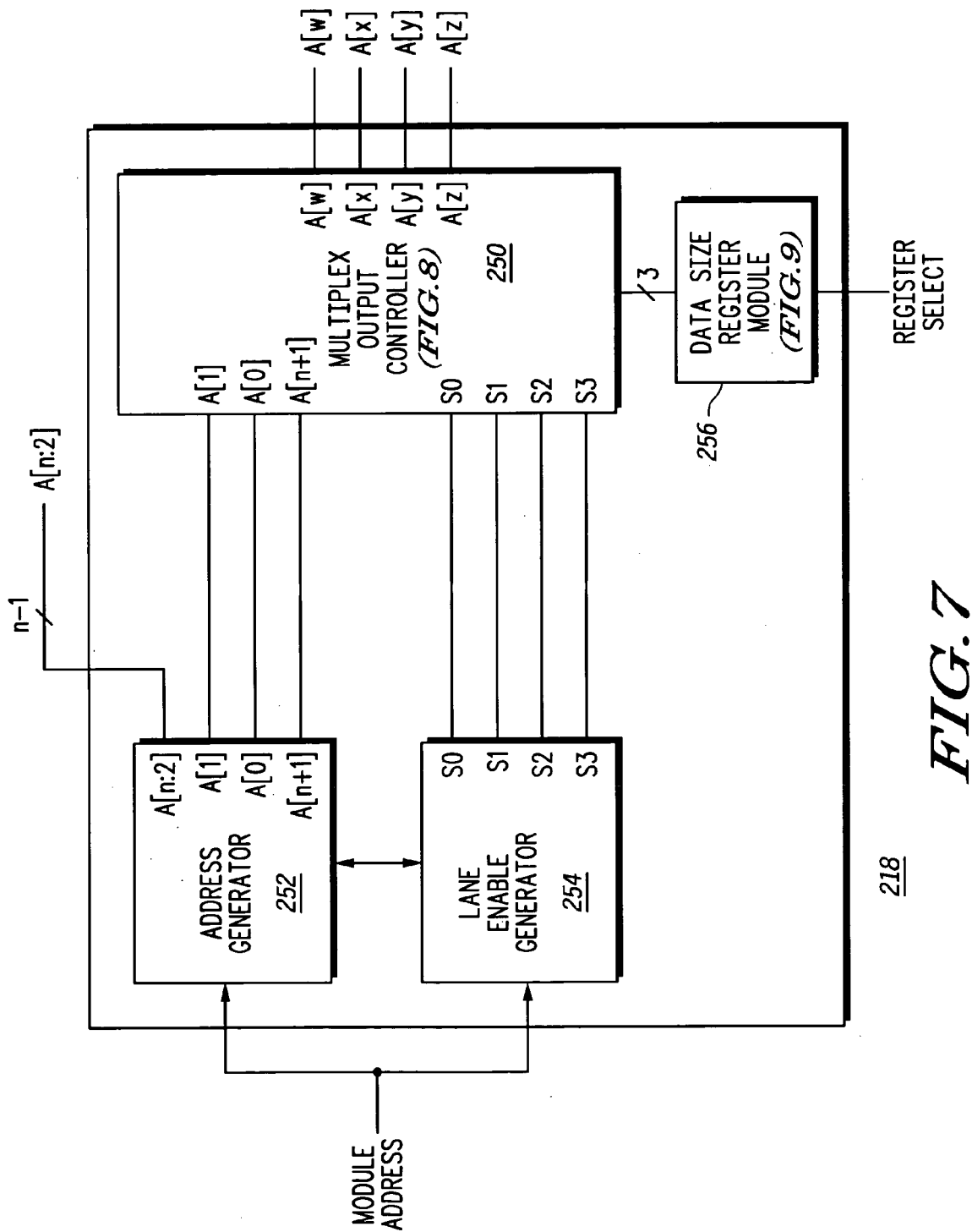
FIG. 7 is a block diagram view depicting an external interface module in accordance with embodiments of the disclosures made herein.

FIG. 7 depicts various functional components of the external interface module 218 of FIG. 1 that can be used to implement the functionality described with reference to the table of FIG. 2. The external interface module 218 includes a multiplex output controller 250, an address generator 252, a lane enable generator 254 and a data size register module 256. The address generator 252, the lane enable generator 254 and the data size register module 256 are each connected to the multiplex output controller 250.

In response to receiving a module address from one of the peripheral modules of FIG. 1, the address generator 252 and the lane enable generator 254 generate appropriate address bits A[0:n+1] and byte lane enables S[0:3], respectively. Bits that are subject to being multiplexed A[0], A[1], A[n:2], A[n+1], S[0], S[1], S[2] and S[3]) are provided to the multiplex output controller. In response to the data size register module 256 receiving a register select, the data size register module 256 will determine corresponding DSZ bits which are used to provide the data signals A[0], A[1], A[n+1], S[0], S[1], S[2] and S[3] to the appropriate output location. As discussed above in reference to FIG. 2, the address bit A[n+1] expands the addressable memory depth of a processor based system when a specific access does not require four pins for least significant address bits or a lane enable.

Figure 8:
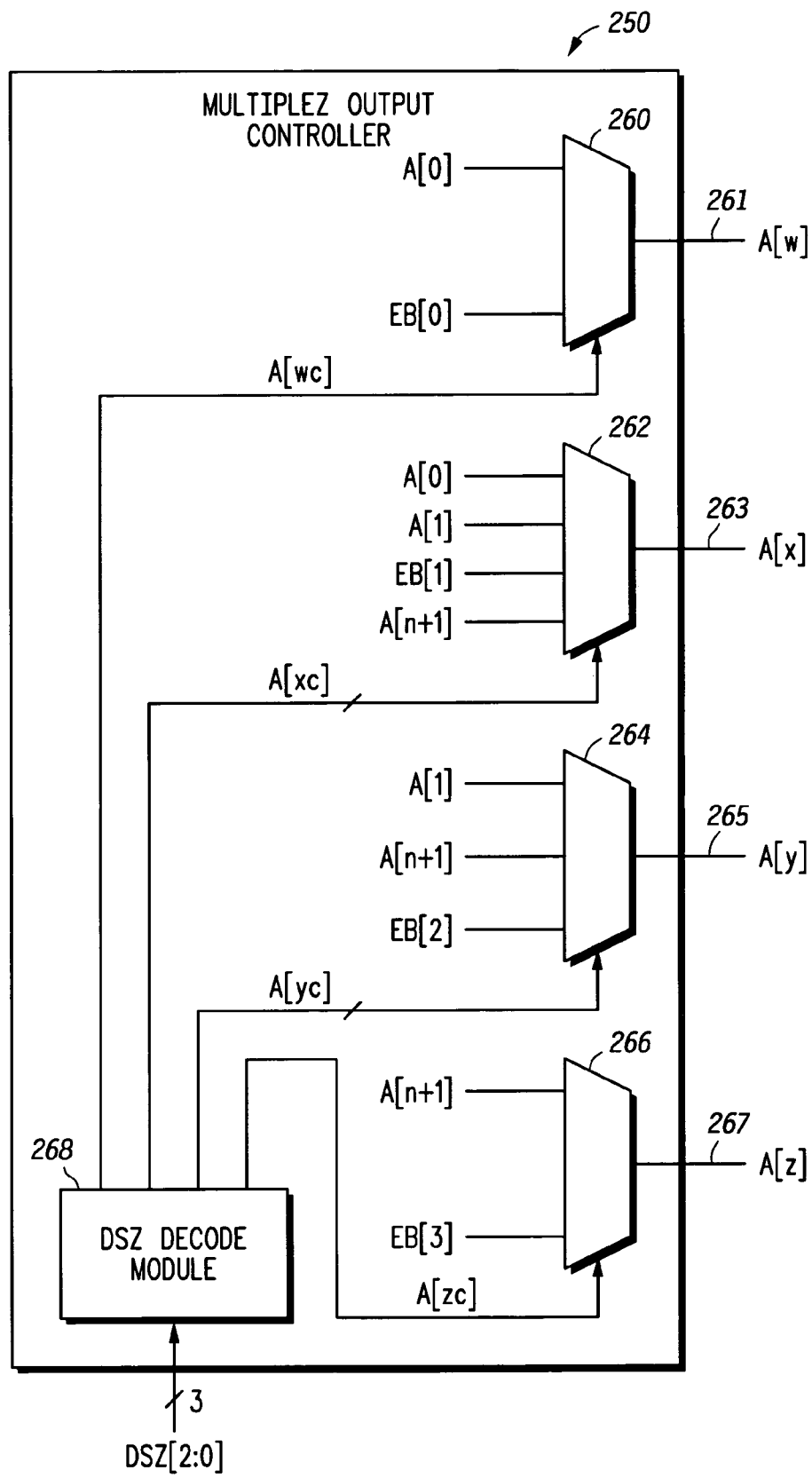
FIG. 8 is a block diagram view depicting a multiplex output controller of the external interface module depicted in FIG. 6.

As depicted in FIG. 8, in accordance with at least one embodiment of the disclosures herein, the multiplex output controller 250 includes a first multiplexer 260, a second multiplexer 262, a third multiplexer 264, a fourth multiplexer 266 and a DSZ decode module 268. Each one of the multiplexers (260–266) has an output corresponding to a respective one of the multiplexed outputs A[z:w] and has a plurality of inputs connected thereto. The DSZ decode module 268 is capable of providing a control signal (i.e. one or more a control bits) to each one of the multiplexers (260–266). In response to the DSZ decode module receiving a DSZ input (i.e. DSZ bits) from the data size registers 256, the DSZ decode module 268 uses the DSZ signal for determining which one or more of the multiplexers (260–266) receives a corresponding control signal and subsequently provides such one or more of the multiplexers (260–266) with the corresponding control signal. The function of the data size registers 256 is discussed below in reference to FIG. 8.

The first multiplexer 260 is a two input multiplexer providing an output associated with a first one of the multiplexed outputs A[z:w] (i.e. the first multiplexed output A[w]). The output provided by the first multiplexer 260 is provided at an output node 261. An first address bit A[0] and a first byte lane enable EB[0] are provided as inputs to the first multiplexor 260. A first control signal A[wc] is provided by the DSZ decode module 268 to the first multiplexer 260 for determining which input is provided as the output from the first multiplexer 260.

The second multiplexer 262 is a four input multiplexer providing an output associated with a second one of the multiplexed outputs A[z:w] (i.e. the second multiplexed output A[x]). The output provided by the second multiplexer 262 is provided at a third output node 263. The first address bit A[0], a second address bit A[1], a second byte lane enable EB[1] and a third address bit A[n+1] are provided as inputs to the second multiplexer 262. A second control signal A[xc] is provided by the DSZ decode module 268 to the second multiplexer 262 for determining which input is provided as the output from the second multiplexer 262.

The third multiplexer 264 is a three input multiplexer providing an output associated with a third one of the multiplexed outputs A[z:w] (i.e. the third multiplexed output A[y]). The output provided by the third multiplexer 264 is provides at a third output node 265. The second address bit A[0], a third byte lane enable EB[2] and the third address bit A[n+1] are provided as inputs to the third multiplexor 264. A third control signal A[yc] is provided by the DSZ decode module 268 to the third multiplexer 264 for determining which input is provided as the output from the third multiplexer 264.

The fourth multiplexer 266 is a two input multiplexer providing an output associated with a fourth one of the multiplexed outputs A[z:w] (i.e. the fourth multiplexed output A[z]). The output provided by the fourth multiplexer 264 is provides at a fourth output node 267. A fourth byte lane enable EB[3] and the third address bit A[n+1] are provided as inputs to the fourth multiplexor 266. A fourth control signal A[zc] is provided by the DSZ decode module 268 to the fourth multiplexer 266 for determining which input is provided as the output from the fourth multiplexer 266.

As depicted in FIG. 8, in accordance with at least one embodiment of the disclosures herein, the data size register module 256 includes a plurality of data size (DSZ) registers 280 and a DSZ selector 282 connected to each one of the data size registers 280. In response to receiving a given register select signal, the DSZ selector 282 facilitates determining a corresponding data size register and providing data size bits (i.e. DSZ bits [2:0]) associated with the corresponding data size register to the DSZ decode module 268 of the multiplex output controller 250. In one embodiment, a chip select signal being asserted, or to be asserted, can be used as the register select. Specific embodiments of the DSZ bits [2:0] and the resulting functionality of the multiplexed outputs A[z:w] are depicted in FIG. 2. Determining data size bits associated with a specific register select is an example of determining a mode of operation for at least one of the multiplexed outputs A[z:w].

Figure 9:
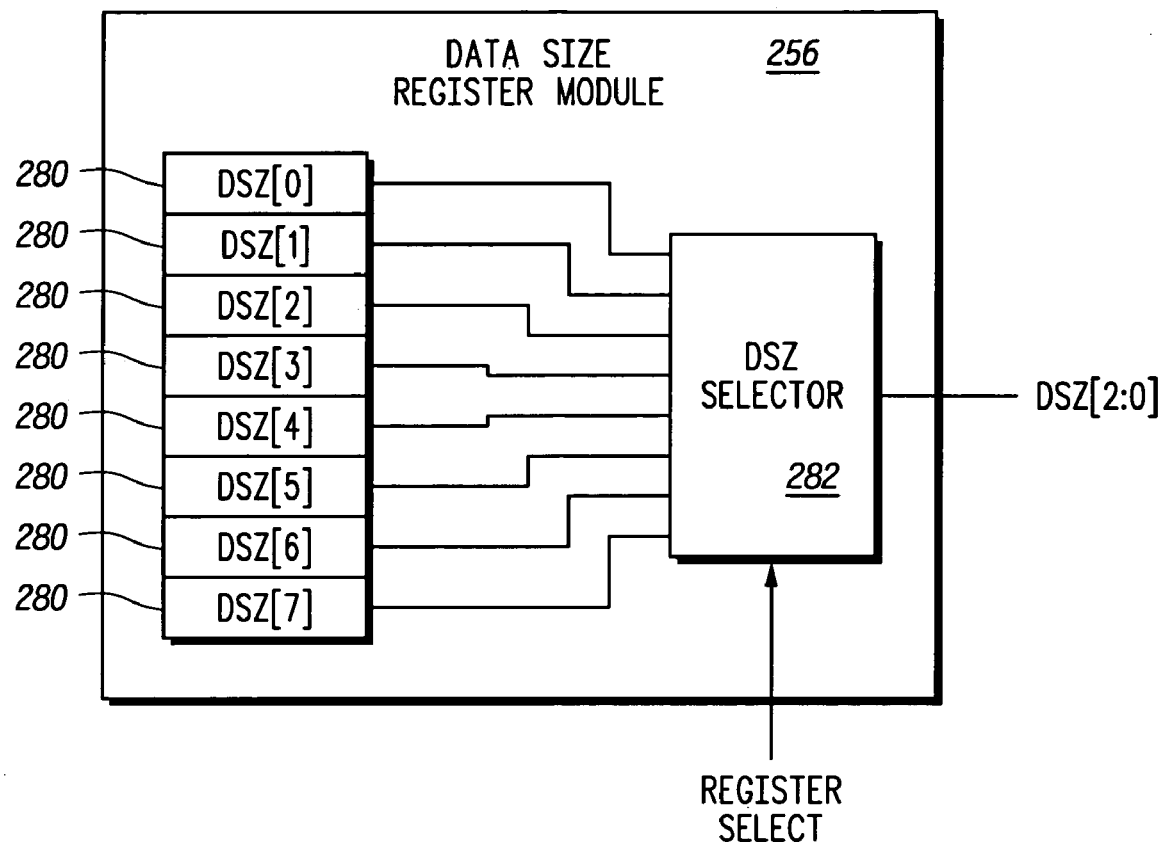
FIG. 9 is a block diagram view depicting a data size register of the external interface module depicted in FIG. 6.

FIG. 9 illustrates the Data size register module 256 of FIG. 7 in greater detail. Specifically, the Data size register module 256 of FIG. 9 illustrates a plurality of data size registers 280 connected to a DSZ selector 282. The data stored within one of the data size registers is provided at the output of the DSZ selector 282, as data DSZ[2:0], based upon a register select signal. One embodiment, the register select signal is based upon a chip select signal. For example, if CS4 is to be asserted, the value stored in DSZ[4] will be provided at the output of the selector 282. In this manner, the functionality of the multiplexed outputs A[z:w] can be dynamic based on the active chip select.

It will be appreciated because the functionality of the multiplexed output A[w:z] varies on an access by access basis, depending upon a specific chip select, that additional timing consideration may need to be considered. For example, if a specific multiplexed output is changing its functionality from being an address output to being a lane enable output, it will generally be necessary to avoid any race condition that would allow the address data of the previous state from being interpreted as an active enable signal of a subsequent state. This can be accomplished by making sure than when a new chip select is to be asserted, indicating a functional transition in the multiplexed outputs that it does so after the multiplexed output data has transitioned. For example, a half-cycle, or more, of delay can be added between when the multiplexed outputs change and when a new chip select is asserted. It will be appreciated, that the system can also be designed to assure no race condition will exist without the addition extra clock cycles.

Figure 10:
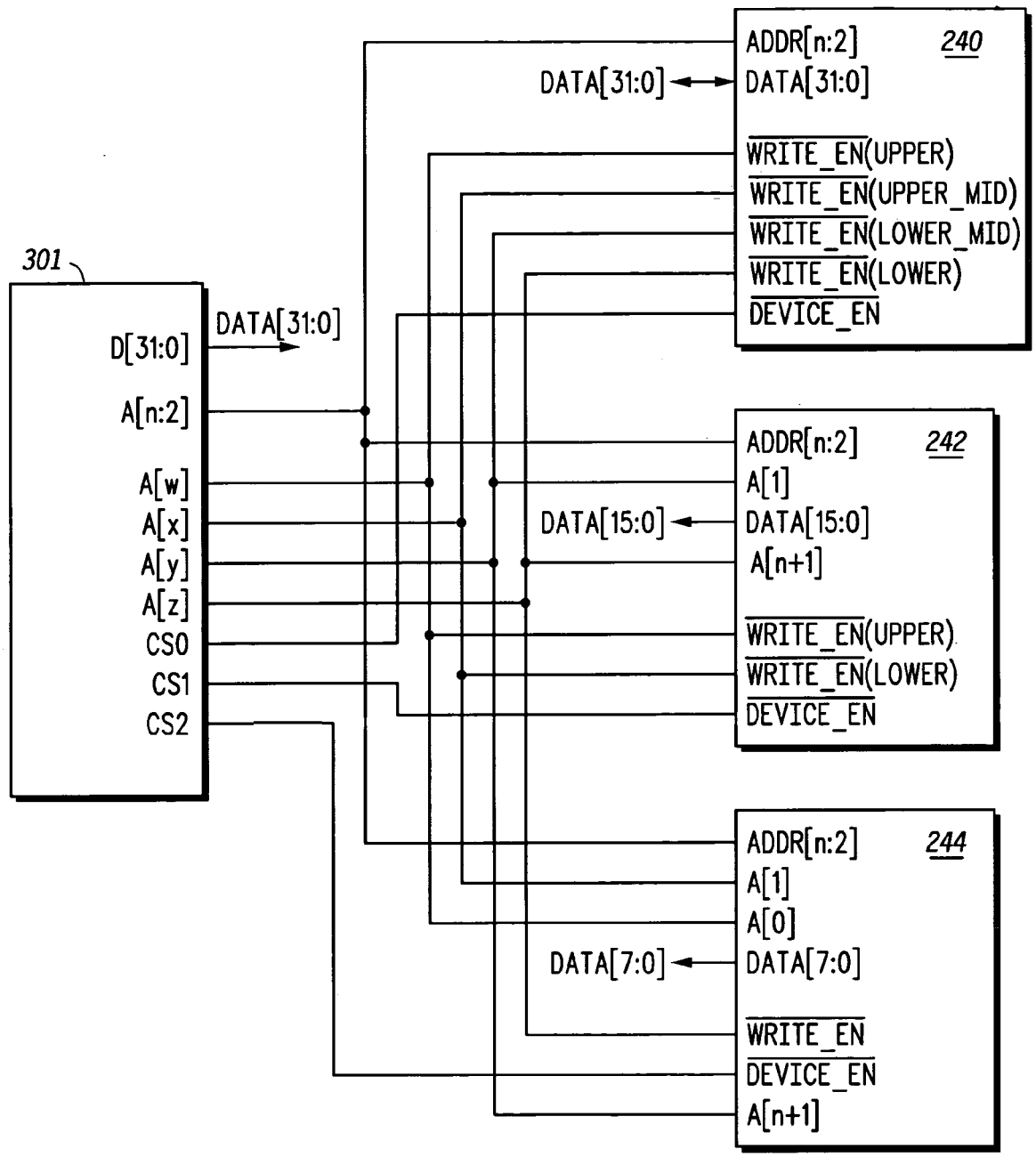
FIG. 10 is a block diagram view depicting an external interface module in accordance with an embodiment of the disclosures made herein, wherein the external interface module is connected to a word-wide, half word-wide and byte wide accessible memories.

FIG. 10 illustrates system 300 having a data processing device 301, similar to device 101, coupled to one word wide device 240, one half-word wide device 242, and one byte wide device 244. Chip selects CS0, CS1, and CS2 enable the devices 240, 242, and 244 respectively. Multiplexed output A[w] is connected to devices 240, 242, and 244 to operate as a lane enable, another lane enable, and the address bit A[0], respectively. Multiplexed output A[x] is connected to devices 240, 242, and 244 to operate as a lane enable, another lane enable, and the address bit A[1], respectively. Multiplexed output A[y] is connected to devices 240,242, and 244 to operate as a lane enable, another lane enable, A[1], and A[n+1], respectively. Multiplexed output A[z] is connected to devices 240, 242, and 244 to operate as a lane enable, A[n+1], and a lane enable, respectively. As indicated, the system 300 is designed to have memory 242 access data on DATA[15:0], while memory 242 will access data on DATA[7:0].

It should be understood that the specific steps indicated herein, and/or the functions of specific modules herein, may be implemented in hardware and/or software. For example, a specific step or function may be performed using software and/or firmware executed on one or more a processing modules. In addition, the logic functions performed by hardware representations herein, such as the multiplexers of FIG. 8 can be implemented in a variety of manners. For example, it will be appreciated that the illustrated multiplexer of FIG. 8 can be implemented using various hardware or software implementations that route data in the manner described.

For example, a system for accessing memory devices as described herein may include a generic processing module and memory. The processing module can be a single processing device or a plurality of processing devices used to determine the data bits to be provided to the multiplexed outputs A[w:z]. Such a processing device may be a microprocessor, microcontroller, digital processor, microcomputer, a portion of a central processing unit, a state machine, logic circuitry, and/or any device that manipulates the signal.

The manipulation of signals by a processing device, such as a microprocessor, is generally based upon operational instructions represented in a memory. The memory may be a single memory device or a plurality of memory devices. Such a memory device may be a read only memory, a random access memory, a floppy disk memory, magnetic tape memory, erasable memory, a portion of a system memory, and/or any device that stores operational instructions in digital format. Note that when the processing module implements one or more of its functions, it may do so where the memory storing in the corresponding operational instructions is embedded within the circuitry comprising a state machine and/or other logic circuitry.

In the preceding detailed description, reference has been made to the accompanying drawings that form a part hereof, and in which are shown by way of illustration specific embodiments in which the invention may be practiced. These embodiments and certain variants thereof, have been described in sufficient detail to enable those skilled in the art to practice the invention. It is to be understood that other suitable embodiments may be utilized and that logical, mechanical, chemical and electrical changes may be made without departing from the spirit or scope of the invention. For example, the invention has been described with respect to a 32-bit word and byte wide enables, however, it will be appreciated that other word and lane strobe widths can be used, and that a word of memory as claimed includes not only a word width of 32 bits, but other word widths as well. In addition, it will be appreciated that the functional blocks shown in the figures could be further combined or divided in a number of manners without departing from the spirit or scope of the invention. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method comprising:
   when in a first mode of operation, utilizing a first output to provide a first data lane enable for facilitating access of a portion of a first memory storage location associated with a first memory address; and
   when in a second mode of operation, utilizing the first output to provide an address bit of a second memory address for facilitating designation of a second memory storage location, wherein the address bit is an additional address bit used to extend an address range when a memory having a width less than a word width is being accessed.

2. The method of claim wherein:
   the first data lane enable facilitates accessing a byte of data associated with the first memory address when in the first mode of operation; and
   the second memory address accesses a byte wide memory.

3. The method of claim 1 wherein:
   the first output is the first output of a first device; and
   the first and second modes of operation utilize the first output to access a second device external the first device.

4. The method of claim 3 further comprising:
   when in a third mode of operation, utilizing the first output to provide information about a memory access internal to the device that includes the first output.

5. The method of claim 1, further comprising:
   determining a made of operation to be one of the first mode of operation and the second mode of operation.

6. The method of claim 5, wherein:
   determining the mode of operation is based upon a register value associated with a specific chip select.

7. The method of claim 1 further comprising:
   when in the first mode of operation, utilizing a second output to provide an address bit of the first memory address for facilitating designation of the first memory storage location; and
   when in the second mode of operation, utilizing the second output to provide a second data lane enable for facilitating access of a portion of the second memory storage location associated with the second memory address.

8. A method of providing data to a set of pins of a device, the set of pins coupled to a memory, the method comprising:
   during a first mode of operation, multiplexing a first set of data onto the set of pins to allow the set of pins to provide data representing two least significant bits of a first address, a most significant bit of the first address, and a lane enable;
   during a second mode of operation, multiplexing a second set of data onto the set of pins to allow the set of pins to provide data representing one least significant bit of a second address, a most significant bit of the second address, and two lane enables; and
   during a third mode of operation, multiplexing a third set of data onto the set of pins to allow the set of pins to provide four lane enables.

9. The method of claim 8, wherein the first, second and third sets of data facilitate an external memory access, wherein the external memory access is external relative to the device.

10. The method of claim 9, further comprising;
    during a fourth mode of operation multiplexing a fourth set of data onto the set of pins to allow the set of pins to provide information relating to an internal memory access.

11. The method of claim 8 further comprising:
    determining the mode of operation is based upon a chip select indicator.

12. An apparatus comprising:
    a set of address nodes coupled to a memory to provide address data for address bit locations A(n) through A(2), where A(n) represents a most significant bit for at least a first mode of operation;
    a first output node coupled to the memory to provide one of an address data for address bit location A(1) and a data lane enable signal based upon a mode of operation;
    a second output node coupled to the memory to provide one of an address data for address bit location A(0) and a data lane enable signal based upon the mode of operation; and
    a third output node coupled to the memory to provide one of an address data for address bit location A(n+1) and a data lane enable signal based upon the mode of operation.

* * * * *